US010295051B2

(12) United States Patent
Grethel et al.

(10) Patent No.: US 10,295,051 B2
(45) Date of Patent: May 21, 2019

(54) GEARBOX CONTROL SYSTEM

(71) Applicant: Schaeffler Technologies AG & Co. KG, Herzogenaurach (DE)

(72) Inventors: Marco Grethel, Buhlertal (DE); Markus Baehr, Buhl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 398 days.

(21) Appl. No.: 15/127,951

(22) PCT Filed: Mar. 16, 2015

(86) PCT No.: PCT/DE2015/200162
§ 371 (c)(1),
(2) Date: Sep. 21, 2016

(87) PCT Pub. No.: WO2015/149778
PCT Pub. Date: Oct. 8, 2015

(65) Prior Publication Data

US 2017/0037960 A1 Feb. 9, 2017

(30) Foreign Application Priority Data

Apr. 1, 2014 (DE) ........................ 10 2014 206 194

(51) Int. Cl.

| | |
|---|---|
| ***F16H 61/02*** | (2006.01) |
| ***F16H 61/688*** | (2006.01) |
| ***F16H 61/00*** | (2006.01) |
| *F16H 61/30* | (2006.01) |

(52) U.S. Cl.
CPC ..... *F16H 61/0267* (2013.01); *F16H 61/0025* (2013.01); *F16H 61/0276* (2013.01); *F16H 61/688* (2013.01); *F16H 61/0206* (2013.01); *F16H 61/30* (2013.01)

(58) Field of Classification Search
None
See application file for complete search history.

(56) References Cited

U.S. PATENT DOCUMENTS

| | | | | |
|---|---|---|---|---|
| 8,490,391 | B2 | 6/2013 | Franz et al. | |
| 2003/0047410 | A1* | 3/2003 | Busold .................... | F16D 25/14 192/103 F |
| 2009/0321209 | A1 | 12/2009 | Grethel et al. | |

(Continued)

FOREIGN PATENT DOCUMENTS

| | | |
|---|---|---|
| DE | 19900852 | 7/1999 |
| DE | 102008009653 | 9/2008 |

(Continued)

*Primary Examiner* — Timothy Hannon
(74) *Attorney, Agent, or Firm* — Volpe and Koeing, P.C.

(57) ABSTRACT

The invention relates to a gearbox control system for the fluidic operation of a gearbox which includes a plurality of gears that can be selected and shifted by a gearbox actuator device, and for the fluidic operation of two partial clutches of a dual clutch. The invention is characterized in that the gearbox control system includes two reversing pump actuators which are each assigned one of the partial clutches and which each have two connections to which a fluidic AND valve is connected, the latter having a tank connection as a third connection, wherein the gearbox actuator device is connected to the two reversing pump actuators via a fluidic OR valve.

12 Claims, 7 Drawing Sheets

10 20 21 30 11 52 32 41 31 12 45 51 42 22 35

(56) References Cited

U.S. PATENT DOCUMENTS

| | | | |
|---|---|---|---|
| 2013/0306431 | A1 | 11/2013 | Ruehle et al. |
| 2014/0080666 | A1 | 3/2014 | Ruhle et al. |
| 2014/0124323 | A1 | 5/2014 | Heubner |

FOREIGN PATENT DOCUMENTS

| | | |
|---|---|---|
| DE | 102010047801 | 5/2011 |
| DE | 102011102277 | 11/2012 |
| DE | 102013000157 | 1/2014 |
| EP | 2664826 | 11/2013 |

* cited by examiner 21
20
22
41
42
11
12
150
45
152
151
32
31
35
30
94

GEARBOX CONTROL SYSTEM

BACKGROUND

The invention relates to a gearbox control system for the fluidic operation of a gearbox, which comprises several gears that can be selected and shifted with the help of a gearbox actuator device, and for the fluidic operation of two partial clutches of a duplex clutch.

A hydraulic device is known from the German patent publication DE 10 2008 009 653 A1 for controlling a duplex clutch gearbox of a motor vehicle, which comprises: a hydraulic energy source for supplying hydraulic energy to the hydraulic arrangement via a hydraulic medium; a pressure reservoir for storing hydraulic energy; a clutch cooling device for cooling the clutches of a duplex clutch gearbox using the hydraulic medium; clutch actuators for operating a first clutch and a second clutch, with the hydraulic energy source comprising a double-flow electric pump. A hydrostatic actuator is known from the German patent publication DE 10 2010 047 801 A1 comprising a master cylinder, having a housing and a pressure chamber inside the housing, which is axially displaceable and filled with pressure medium, comprising a piston that can be impinged with pressure, having a planetary gear with a sheath converting the rotary drive into an axial motion, with the planetary gear being driven by an electric motor.

SUMMARY

The objective of the invention is to simplify the fluidic operation of a gearbox comprising several gears, which can be selected and switched with the help of a gearbox actuator device, and the fluidic operation of two partial clutches of a duplex clutch.

The objective, to allow in a gearbox control system for the fluidic operation of a gearbox comprising several gears which can be selected and switched with the help of a gearbox actuator device, and to actuate two partial clutches of a duplex clutch in a fluidic fashion, is attained such that the gearbox control system comprises two reversible pump actuators, with one each being allocated to one of the partial clutches, which respectively show two connections to which a fluidic AND valve is connected, which has a tank connection as its third connection, with the gearbox actuator device being connected via a fluidic OR valve to the two reversible pump actuators. The reversible pump actuators preferably represent fluidic pumps that can be operated in opposite conveyance directions. The fluidic pumps particularly represent hydraulic pumps, which are operated with a hydraulic medium, such as hydraulic oil. The hydraulic pumps are preferably embodied in a positive displacement design. The hydraulic pumps may be embodied as vane pumps, geared pumps, or plunger pumps. Advantageously here electric motors are used to drive the reversible pump actuators. In a first conveyance direction the reversible pump actuators can be used for example to operate a partial clutch, particularly in order to close it. In a second conveyance direction the reversible pump actuators can be used for example to operate a gearbox actuator of the gearbox actuator device. Here, one of the gearbox actuators advantageously serves to select a gear of the gearbox. The other gearbox actuator serves advantageously for switching the selected gear. Gearbox actuators serving to execute a selection and/or shifting motion are called gear changing devices. The partial clutches of the duplex clutch can be actuated directly or indirectly. The partial clutches may be embodied as wetrunning or dry-running ones. By a combination according to the invention of the two reversible pump actuators in the gearbox control system with the two AND valves and the OR valve the gearbox control system can be considerably simplified. The AND valves are also called two-pressure valves and allow in a particularly advantageous fashion different gearbox functions, independent from the direction of rotation. The AND valves are respectively allocated to the pump connections of the reversible pump actuators. With the OR valve it is easily possible that the respective reversible pump actuator, presently not involved in the operation of an allocated partial clutch, supplies the corresponding gearbox actuator of the gearbox actuator device with a feed rate and a feed pressure.

A preferred exemplary embodiment of the gearbox control system is characterized in that the gearbox actuator device for implementing the switching function comprises a pivotal actuator with a reset function. In order to implement the reset function for example a return spring device may be used. The return spring device may comprise a return spring or several return springs, for example two return springs. During experiments performed within the scope of the present invention it was determined that, particularly under dynamic aspects, it proved advantageous for the pivotal actuator to comprise a reset function.

Another preferred exemplary embodiment of the gearbox control is characterized in that the gearbox actuator device for implementing the selective function comprises a single-action fluid cylinder with a reset function. The reset function is provided with a return spring device, for example. The return spring device comprises for example one return spring by which the single-action acting fluid cylinder is pre-stressed into an initial position. The single-action fluid cylinder advantageously replaces a double-action fluid cylinder. This way the complexity of the required valve logistic can be considerably reduced. The return spring device for implementing the reset function acts preferably in the direction of the earth's gravity.

Another preferred exemplary embodiment of the gearbox control system is characterized in that the gearbox actuator device comprises a shift actuator and a selection actuator, which are controlled by a common valve device. The shift actuator preferably represents the above-described pivotal actuator. The selection actuator preferably represents the above-described single-action fluid cylinder. The joint valve device is for example embodied as a directional valve. The directional valve may be embodied as a longitudinal slide valve. The joint valve device is preferably pre-stressed into a central position which serves for adjusting the selection actuator.

Another preferred exemplary embodiment of the gearbox control system is characterized in that the joint valve device is embodied as a 6/3-directional valve with a central setting for adjusting the selecting actuator and two settings for adjusting the switch actuator. This way, using only one joint valve device, the selection function and the shift function of the gearbox control system can be implemented in a simple fashion.

Another preferred exemplary embodiment of the gearbox control system is characterized in that the joint valve device is embodied as a 6/5-directional valve with a central setting for adjusting the selection actuator, two settings for adjusting the shift actuator, and two intermediate settings. The intermediate settings allow in a simple fashion a passive return of a shifting rod of the gearbox actuator device into an idle position. When changing from a central position to the settings for adjusting the shift actuator the intermediate settings are crossed in a highly dynamic fashion such that a position of the gearbox actuator device selected is not left.

Another particularly preferred exemplary embodiment of the gearbox control system is characterized in that the joint valve device can be operated directly by an electromagnet. This has proven advantageous with regards to the valve logistic of the joint valve device.

Another preferred exemplary embodiment of the gearbox control system is characterized in that the joint valve device can be operated via a pilot valve. The pilot valve represents for example a 2/2-directional valve embodied as a proportional valve, which is controlled electromagnetically for example.

Another preferred exemplary embodiment of the gearbox control system is characterized in that the joint valve device is embodied as a rotary slide valve. This has proven advantageous with regards to the shift dynamic of the joint valve device.

Another preferred exemplary embodiment of the gearbox control system is characterized in that the joint valve device is controlled by a rotary device. The rotary drive of the joint valve device embodied as a rotary slide valve represents for example a stepper motor.

Another preferred exemplary embodiment of the gearbox control system is characterized in that the gearbox actuator device comprises a shift actuator and a selection actuator, which are controlled by two identically designed proportional-directional valve. This way the production expense can be further reduced. The identically designed proportional-directional valves are embodied for example as 4/3 directional valves and are preferably operated in an electromagnetic fashion.

Another preferred exemplary embodiment of a gearbox control system is characterized in that the gearbox actuator device comprises a shift actuator and a selection actuator, which are controlled by two identically designed shift valves. This way the production expense can be further reduced. The two identically designed shift valves are embodied as 4/2-directional valves, for example.

The invention perhaps also relates to a method for the fluidic actuation of a gearbox, which comprises several gears, which can be selected and shifted with the help of a gearbox actuator device and for the fluidic actuation of two partial clutches of a duplex clutch comprising one of the above-described gearbox control devices.

BRIEF DESCRIPTION OF THE DRAWINGS

Additional advantages, features, and details of the invention are discernible from the following description in which various exemplary embodiments are described in detail with reference to the drawings. Shown here are.

DETAILED DESCRIPTION OF THE PREFERRED EMBODIMENTS

Figure 1:
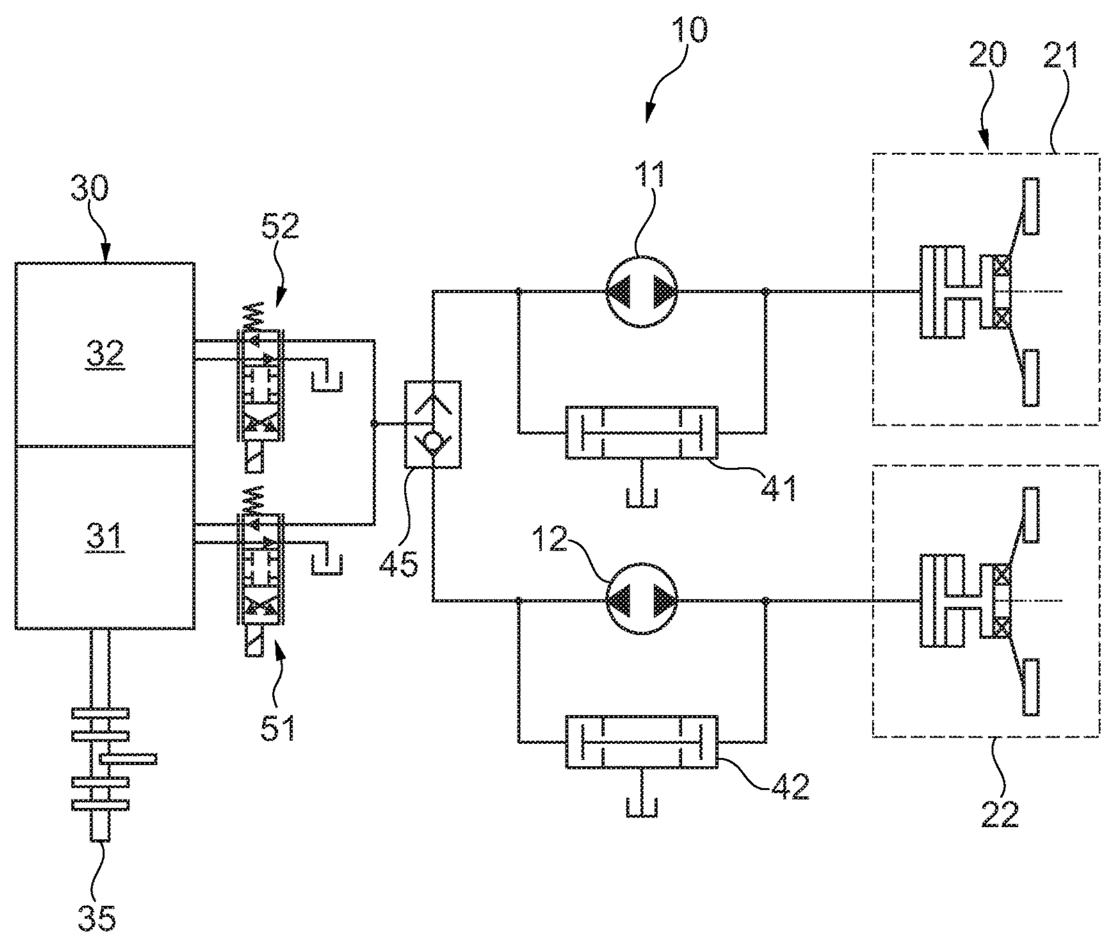
FIG. 1 shows a simplified illustration of a gearbox control system according to the invention with two reversible pump actuators which serve for actuating a duplex clutch and a gearbox actuator device.

FIG. 1 shows in a simplified fashion a gearbox control system 10 with a first reversible pump actuator 11 and a second reversible pump actuator 12. The reversible pump actuators 11 and 12 represent fluid pumps, which can be operated in opposite conveyance directions as indicated by arrow symbols. The reversible pump actuators 11 and 12 allow in a particularly beneficial fashion the operation of a duplex clutch 20 and a gearbox actuator device 30.

The duplex clutch 20 comprises a first partial clutch 21 and a second partial clutch 22. The first partial clutch 21 of the duplex clutch 20 can be actuated by the first reversible pump actuator 11. The second partial clutch 22 of the duplex clutch 20 can be actuated by the second reversible pump actuator 12.

The gearbox actuator device 30 comprises a first gearbox actuator 31 and a second gearbox actuator 32. The first gearbox actuator 31 serves to implement a selection function of the gearbox and is therefore also called the selection actuator. The second gearbox actuator 32 serves preferably for implementing a shift function of the gearbox and is therefore also called the shift actuator. A shifting rod 35 extends from the gearbox actuator device 30 in the vertical direction towards the bottom.

One AND valve 41, 42 each is respectively allocated to the two reversible pump actuators 11, 12. The AND valve 41, 42 is also called a two-pressure valve and has two connections by which the AND valve 41, 42 is connected to the respective connections of the allocated reversible pump actuators 11, 12. The AND valve 41, 42 each comprise a tank connection as the third connection.

The AND valve 41, 42 or the two-pressure valve allows in a simple fashion that different gearbox functions can be implemented independent from the direction of rotation of the reversible pump actuators 11, 12. The gearbox actuator device 30 is coupled via an OR valve 45 to the two reversible pump actuators 11, 12. This provides, among other things, the advantage that the reversible pump actuator 11, 12, which at this time is not involved in the operation of a corresponding clutch 21, 22, can supply the allocated gearbox actuator 32, 31 with a feed rate or a feed pressure.

Two proportional-directional valves 51, 52 are switched between the OR valve 45 and the gearbox actuator device 30. The two proportional-directional valves 51, 52 are embodied as 4/3 directional valves and operated electromagnetically. The two proportional-directional valves 51, 52 are pre-stressed in their switch position shown by a symbolically displayed spring device. The proportional-directional valve 51 is allocated to the selection actuator 31. The proportional-directional valve 52 is allocated to the switch actuator 32.

Figure 2A:
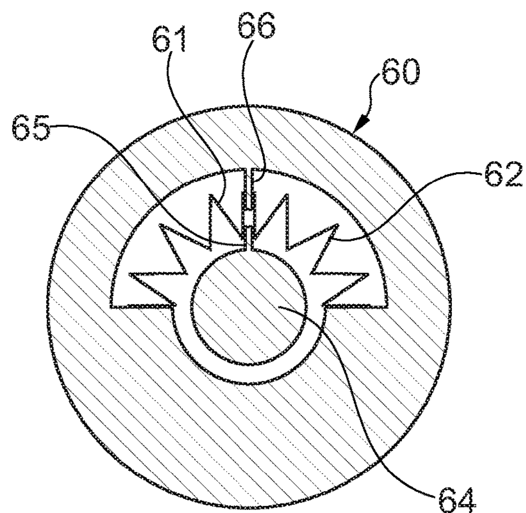
FIGS. 2A and 2B show a simplified illustration of a pivotal actuator with two return springs to implement a reset function.
Figure 2B:
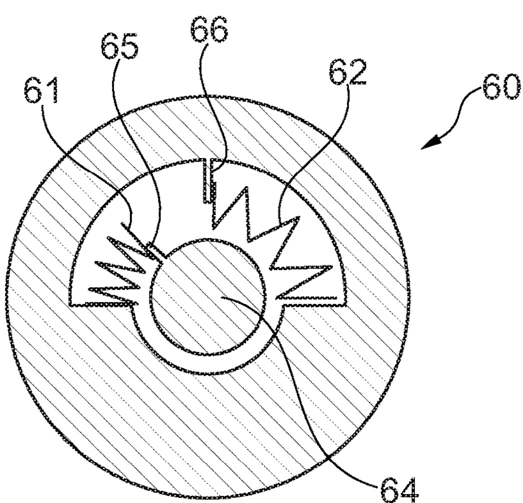
Figure 3A:
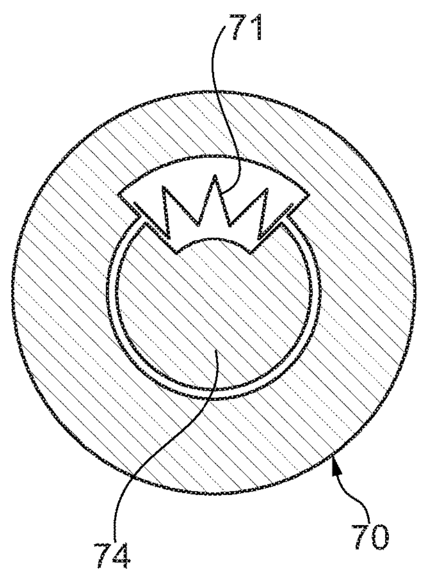
FIGS. 3A and 3B show a similar pivotal actuator as displayed in FIG. 2 with only one return spring for implementing the return function.

FIGS. 2 and 3 show in a simplified version how the switch actuator 32 of FIG. 1 may be designed. The shift actuator is embodied as a pivotal activator 60; 70 in FIGS. 2 and 3. The pivotal actuator 60; 70 has a reset function. FIGS. 2A; 3A show the pivotal actuator 60; 70 in its relaxed position. FIGS. 2B; 3B show the pivotal actuator 60; 70 in its stressed position.

For implementing the reset function, the pivotal actuator 60 has two return springs 61, 62 shown in FIG. 2. The pivotal actuator 60 comprises a pivotal body 64 with a pivotal blade 65. The pivotal blade 65 with the pivotal body 64 is mobile in reference to a fixed blade 66, which is fastened at a fixed housing part of the pivotal actuator 60.

In FIG. 2B it is discernible that the return spring 61 is compressed when the pivotal body 64 with the pivotal blade 65 is rotated in the counter-clockwise direction in reference to the fixed blade.

Figure 3B:
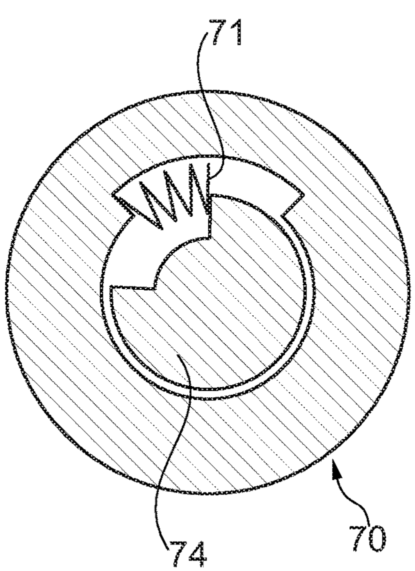

The pivotal actuator 70 shown in FIG. 3 comprises, unlike the previous exemplary embodiment, only one return spring 71. A pivotal body 74 is pivotal in the clockwise as well as counter-clockwise direction in a fixed housing part of the pivotal actuator 70. Here the return spring 71 is compressed as discernible from FIG. 3B.

Figure 4:
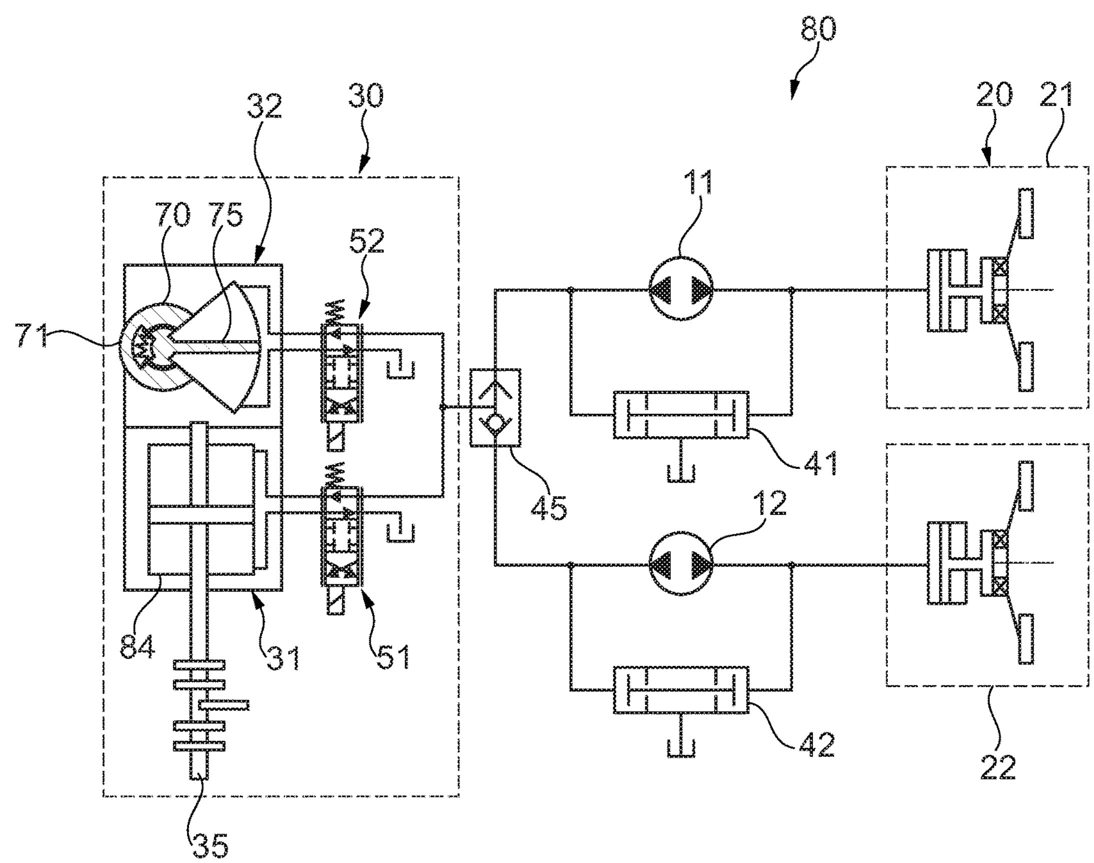
FIG. 4 shows a similar illustration as FIG. 1 comprising one pivotal actuator for implementing the shift function and a double-action fluid cylinder for implementing the selection function of the gearbox.

FIG. 4 shows that the pivotal actuator 70 implementing the shifting actuator 32 can be actuated via a pivotal blade 75 in a fluidic fashion. Using the proportional-directional valve 52 the pivotal blade 75 of the pivotal actuator 70 can be impinged with fluid pressure via the reversible pump actuator 11 either from the top or from the bottom. This way the shifting rod 35 can be appropriately rotated to implement the shift motion.

FIG. 4 shows a gearbox control system 80, which is essentially equivalent to the design of FIG. 1. The selection actuator 31 of the gearbox actuator device 30 is embodied as a double-action fluid cylinder 84. The double-action fluid cylinder 84 is impinged by the reversible pump actuator 21 with fluid pressure for selecting gears via the proportional-directional valve 51.

Figure 5:
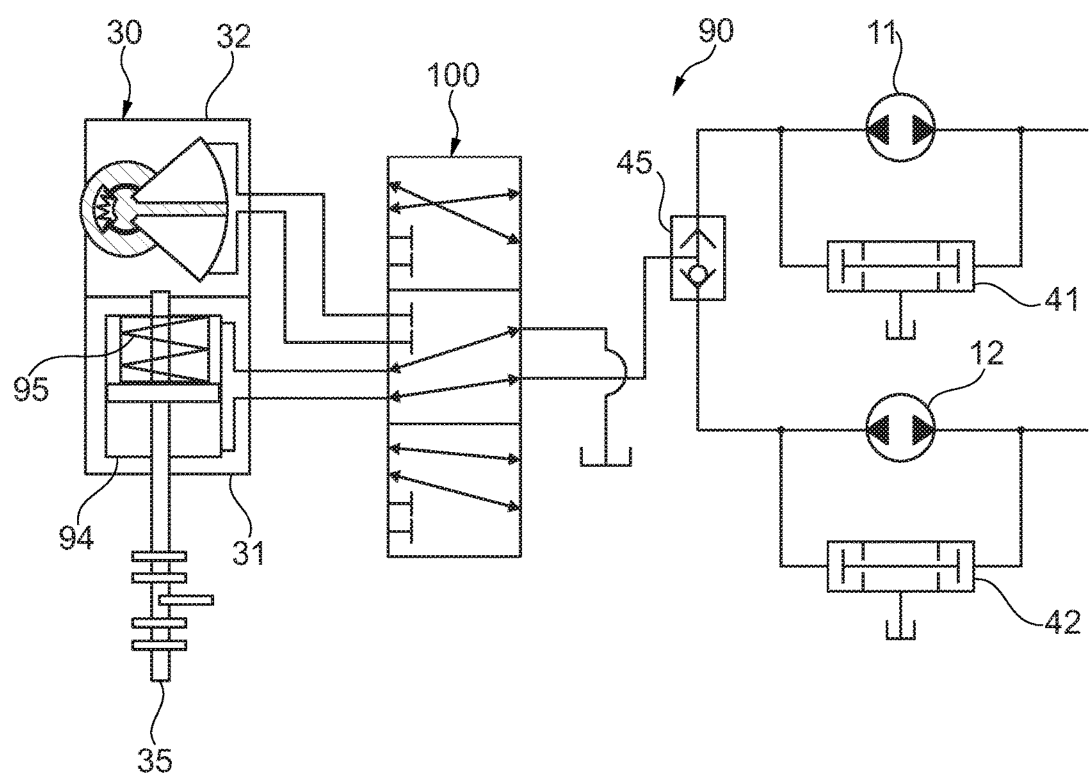
FIG. 5 shows a detail of FIG. 4 with a single-action fluid cylinder for implementing the selection function of the gearbox and with a joint valve device for controlling the gearbox actuator device with the two gearbox actuators.
Figure 6:
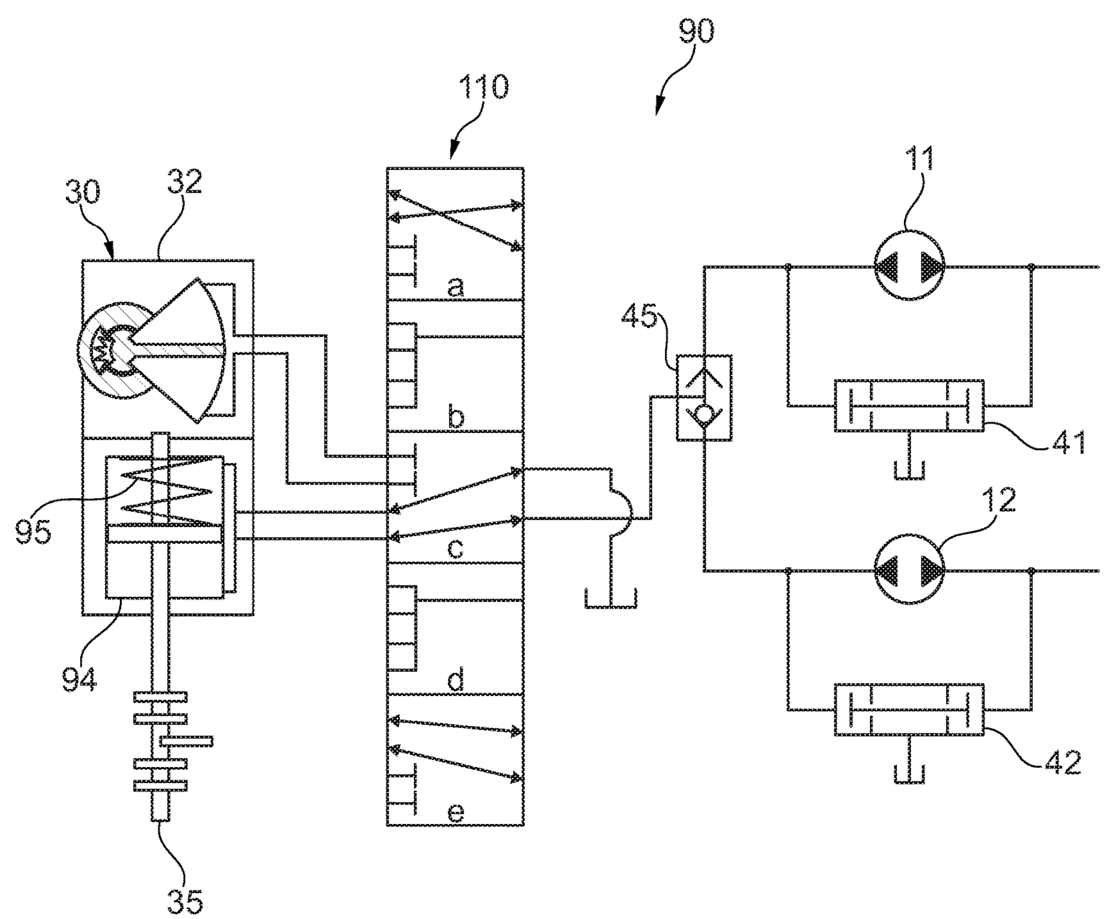
FIG. 6 shows the same illustration as FIG. 5 with a different joint valve device.

FIGS. 5 and 6 show gearbox controls 90 in which the two proportional-directional valves 51, 52 are replaced by a joint valve device 100; 110. In this context, the double-action fluid cylinder 84 in FIGS. 5 and 6 is also replaced by a single-action fluid cylinder 94. The single-action fluid cylinder 94 serves for implementing the selection function and is equipped with a return spring 95. This way the complexity of the necessary valve logic can be considerably reduced. The return spring 95 acts in the single-action fluid cylinder 94 in the direction of the earth's gravity.

The joint valve device 100 shown in FIG. 5 represents a 6/3 directional valve with one central setting for adjusting the selection actuator 31 and two settings for adjusting the shift actuator 32. In the central setting shown the single-action fluid cylinder 94 is released from pressure at both sides. The return spring 95 acts together with the earth's gravity upon the shift rod 35. This way the control of the single-action fluid cylinder 94 is simplified by the bi-directionally operating hydraulic pump which drives the reversible pump actuator 12.

The joint valve device 110 shown in FIG. 6 is embodied as a 6/5 directional valve with a central setting c, two settings a and e for adjusting the shift actuator 32, and two intermediate settings b and d. The intermediate settings b and d serve for the passive return of the shift rod 35 into its idle position. When changing between selecting and shifting the intermediate settings b and d are passed in a highly dynamic fashion so that the adjusted selective position is not left.

Figure 7:
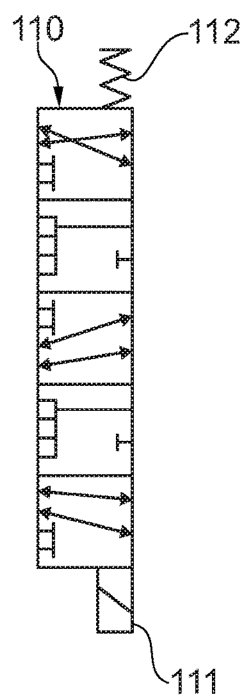
FIG. 7 shows the joint valve device of FIG. 6 alone with control symbols.

In FIG. 7 it is indicated via symbols 111 and 112 that the joint valve device 110 of FIG. 6 can be controlled directly by an electromagnet. By a symbolically indicated spring 112 the joint valve device 110 is pre-stressed in the central setting marked c in FIG. 6. The symbol 111 represents for example an electromagnet acting directly upon the valve logistic.

Figure 8:
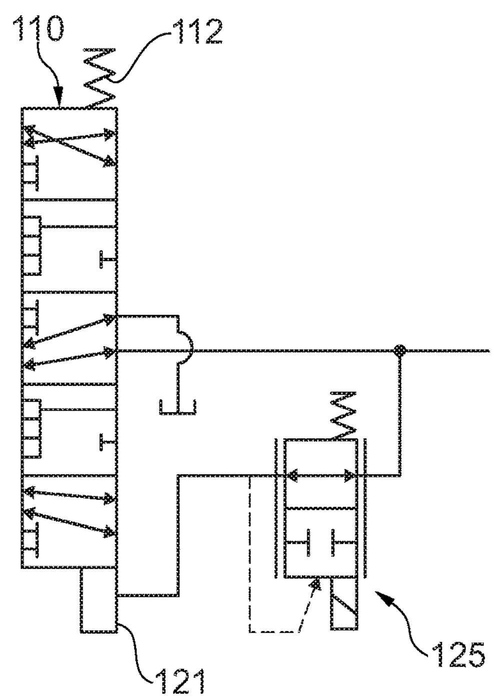
FIG. 8 shows the joint valve device of FIG. 6 alone with one pilot valve.

FIG. 8 shows with the help of symbols 121 and 122 that the joint valve device 110 can also be controlled in a fluidic fashion by a pre-control valve 125. The pilot valve 125 represents a proportional-directional valve with an open setting and a closed setting. The pilot valve 125 is controlled in an electromagnetic fashion and is pre-stressed in the open position shown.

Figure 9:
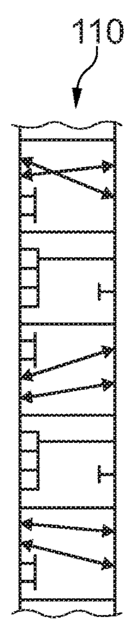
FIG. 9 shows an embodiment of the joint valve device of FIG. 6 as a rotary slide valve.

FIG. 9 shows that the joint valve device 110 may also be embodied as a rotary slider valve. The drive of the rotary slider valve occurs via a rotary drive, for example a stepper motor.

Figure 10:
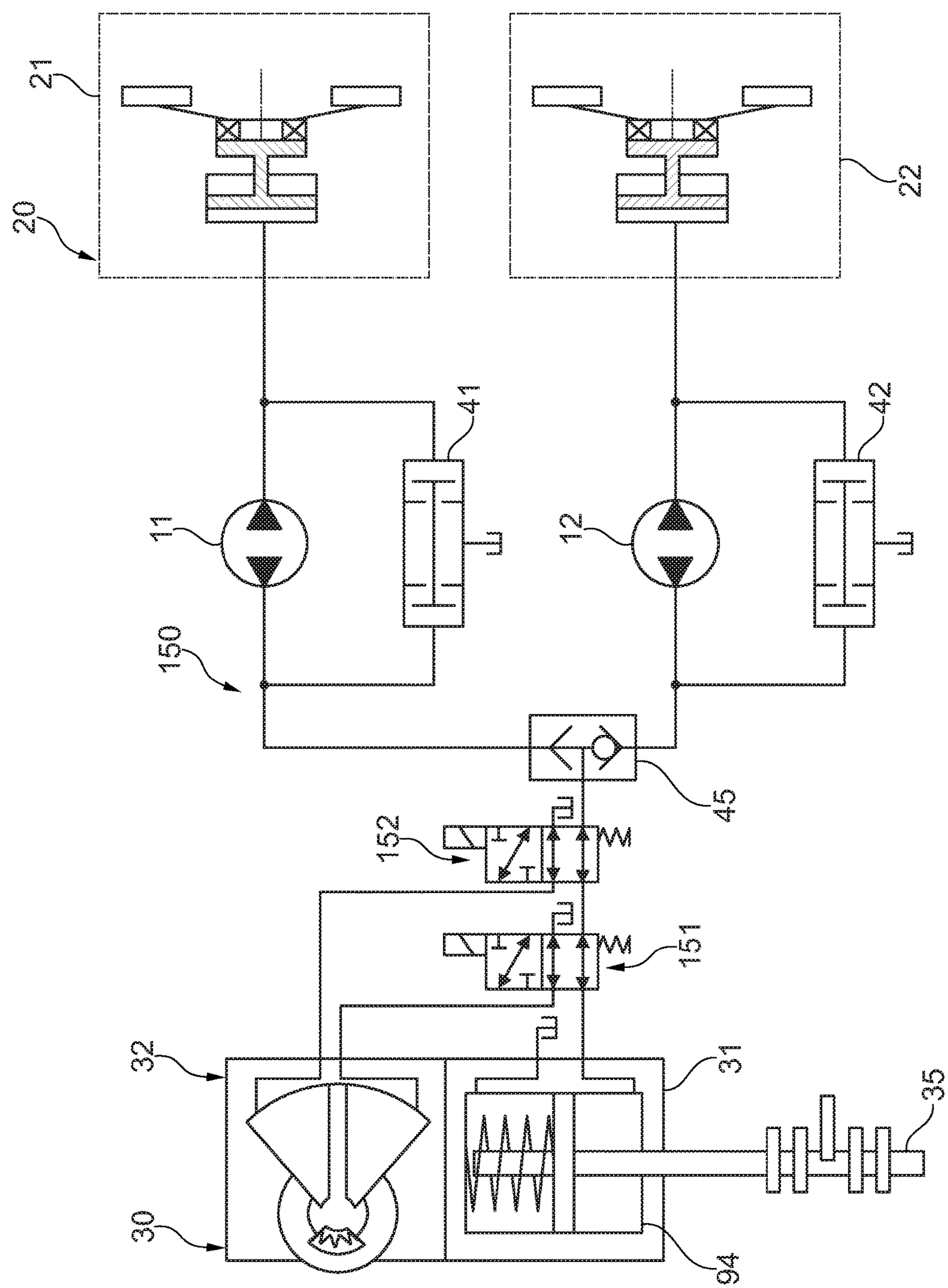
FIG. 10 shows a similar illustration as in FIG. 5 with two identically designed shift valves instead of one joint valve device.

FIG. 10 shows a gearbox control system, 150 similar to the gearbox control system 90 in FIG. 5. Unlike FIG. 5, the joint valve device (100 in FIG. 5) in FIG. 10 is replaced with two identically designed shift valves 151, 152.

The two identically designed shift valves 151, 152 are embodied as 4/2 directional valves. The two shift valves 151, 152 are operated in an electromagnetic fashion, as indicated by a respective symbol. The spring symbols indicate that the two identically designed shift valves 151, 152 are pre-stressed in the normal setting shown in FIG. 10.

When the two shift valves 151, 152, as shown, are in their normal setting, here the respective volume flow source, thus the respective reversible pump actuator 11, 12, is connected to the single-action fluid cylinder 94, which is also called the selection piston.

When one of the two shift valves 151, 152 is actuated, the reversible pump actuator 11, 12 also called pump is respectively connected with one side of the gearbox actuator 32 to the pivotal body and/or the pivotal piston. One shift valve 151, 152 is provided for each direction of rotation.

The gearbox control system 150 shown in FIG. 10 is advantageous in that two relative simple, identically designed shift valves 151, 152 are used. Furthermore, even when one of the shift valves 151, 152 malfunctions, here shifting into gears can still occur in both partial transmissions. The control of selecting and shifting positions occurs via a fine control of the respective reversible pump actuators 11, 12.

LIST OF REFERENCE CHARACTERS

10 Gearbox control system
11 Reversible pump actuator
12 Reversible pump actuator
20 Duplex clutch
21 Partial clutch
22 Partial clutch
30 Gearbox actuator device
31 Gearbox actuator
32 Gearbox actuator
35 Shift rod
41 AND valve
42 AND valve
45 OR valve
51 Proportional-directional valve
52 Proportional-directional valve

60 Pivotal actuator
61 Return spring
62 Return spring
64 Pivotal body
65 Pivotal blade
66 Fixed blade
70 Pivotal actuator
71 Return spring
74 Pivotal body
75 Pivotal blade
80 Gearbox control system
84 Double-action fluid cylinder
90 Gearbox control system
94 Single-action fluid cylinder
95 Return spring
100 Joint valve device
110 Joint valve device
111 Symbol
112 Symbol
121 Symbol
122 Symbol
125 Pilot valve
150 Gearbox control system
151 Control valve
152 Control valve

The invention claimed is:

1. A gearbox control system for fluidic operation of a gearbox, comprising several gears, which are selectable and shifted with a gearbox actuator device, and for fluidic actuation of two partial clutches of a duplex clutch, the gearbox control system comprises two reversible pump actuators each with a respective partial clutch of the two partial clutches being allocated to each of the two reversible pump actuators, said actuators have two connections each, to which a respective fluidic AND valve is connected, which include as a third connection a tank connection, wherein the gearbox actuator device is connected via a fluidic OR valve to the two reversible pump actuators.

2. The gearbox control system according to claim 1, wherein the gearbox actuator device for implementing the shift function comprises a pivoting actuator with a reset function.

3. The gearbox control system according to claim 1, wherein the gearbox actuator device comprises a single-action fluid cylinder with a reset function for implementing a selection function.

4. The gearbox control system according to claim 1, wherein the gearbox actuator device comprises a shift actuator and a selection actuator controlled by a joint valve device.

5. The gearbox control system according to claim 4, wherein the joint valve device is embodied as a 6/3 directional valve with a central setting for adjusting the selection actuator and two settings for adjusting the shift actuator.

6. The gearbox control system according to claim 4, wherein the joint valve device is embodied as a 6/5 directional valve with a central setting (c) for adjusting the selection actuator, two settings (a, e) for adjusting the shift actuator, and two intermediate settings (b, d).

7. The gearbox control system according to claim 4, wherein the joint valve device is directly operated by an electromagnet.

8. The gearbox control system according to claim 4, wherein the joint valve device is operable via a pilot valve.

9. The gearbox control system according to claim 4, wherein the joint valve device is embodied as a rotary slide valve.

10. The gearbox control system according to claim 9, wherein the joint valve device is controlled via a rotary drive.

11. The gearbox control system according to claim 1, wherein the gearbox control device comprises a shift actuator and a selection actuator which are controlled by two identically designed directional valves.

12. The gearbox control system according to claim 1, wherein the gearbox actuator device comprises a shift actuator and a selection actuator controlled by two identically designed shift valves.

* * * * *